July 15, 1958 J. R. PADRICK 2,842,899
EARTH WORKING METHOD

Original Filed June 9, 1949 2 Sheets-Sheet 1

INVENTOR.
John R. Padrick.
BY
Emerson B Donnell
ATTORNEY

July 15, 1958
J. R. PADRICK
2,842,899
EARTH WORKING METHOD
Original Filed June 9, 1949
2 Sheets-Sheet 2
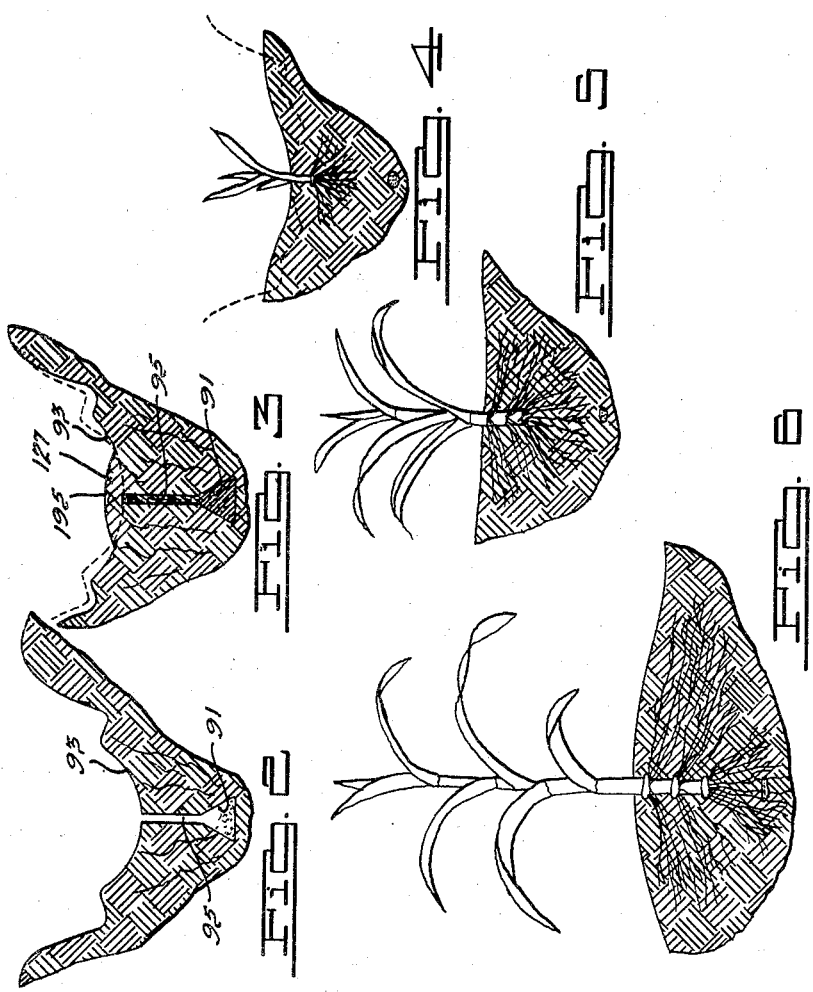
Inventor
John R. Padrick.
By Emerson B Donnell
Attorney

United States Patent Office 2,842,899
Patented July 15, 1958

---

2,842,899

EARTH WORKING METHOD

John R. Padrick, Anniston, Ala.

Original application June 9, 1949, Serial No. 98,107, now Patent No. 2,734,439, dated February 14, 1956. Divided and this application February 6, 1956, Serial No. 563,710

6 Claims. (Cl. 47—58)

This invention relates generally to a novel method for preparing the soil and planting seed, and is a divisional application of applicant's copending patent application for improvements in Earth Working and Planting Implement, Serial No. 98,107, filed June 9, 1949, now Patent No. 2,734,439.

Agricultural experts generally agree that tillage is the primary fundamental of all agriculture and one that has been only slightly improved since the earliest times of man. While labor-saving machines have been developed to enable man to prepare the soil for seeding and to cultivate for the control of weeds, these machines have contributed to the waste of land at unbelievable speed. In most sections of this country there has been very little increase in average acre yield in the past seventy-five years, and the combined efforts of agricultural experts, tons of fertilizer, and improved seed, have done little more than offset the devastating effects of the tillage methods which have been used. There is, therefore, an absolute necessity for a change in tillage methods, if the possible production potential is to be approached.

An analysis of each inch of soil to a depth of sixteen inches indicates that the first two or three inches have the highest pH content, the most satisfactory bacterial count, and most of the plant food inherent to the soil. However, at this depth, moisture is so inconsistent that growing conditions are seldom satisfactory for the full season. From about the fourth inch down, the score on all the aforementioned counts is progressively lower, and from about the sixth inch down there is little or no inducement to plant growth.

The average plowing depth at the present time, for both horse-drawn and tractor-drawn implements, is about three and a half inches, and at about that level, in many soils, a hard pan forms that becomes almost impervious to moisture and annual plant roots. Subsequent and fertilizing of the upper layer, where packing and chemical action occur, also help to form a dense layer. This layer effectively restricts the root zone to a few inches between the pan and the surface. Even in soils which are not conducive to the formation of hard pans, there is often a lack of aeration and therefore oxidation, along with a high concentration of the acid-forming minerals, which leave nothing to offer in the way of plant food in the plant root zone. On many thousands of acres of farm land most or all of the topsoil has been swept away and large areas of subsoil exposed. These exposed areas or clay galls are not productive and are hard to reclaim under normal methods because of their dense nature. With the removal of the topsoil, there is no blanket left to retard the excessive runoff of surface water and since the water is not held on them, there is little moisture penetration. Without moisture over a normal growing season, it is almost impossible to secure a protective cover.

Some soils have too much ground water at or near the surface; and this, of course, makes non-productive land. It is usually not a matter of too much water but too little drainage, and if the water table is kept constantly below fourteen inches there is little or no danger to annual plants.

Since the top two or three inches of soil are subject to extreme changes in moisture conditions, and since it seems to be a feature of the natural phenomena for most soil conditioning elements to become more or less fixed at the level where they are placed, it is apparent that the present methods of application are not conducive to the development of a deeper root zone because the placement level is only within the uncertain moisture zone. Restrictive development of concentrated plant food area to the top three inches is not the best practice because of the extremes in elemental activity at the surface.

Lime, one of the best soil conditioners, when applied to soils containing a reasonable amount of organic matter, causes the soil to flocculate or become granular; but lime applied to soils extremely low in, or devoid of, organic material causes just the reverse condition to obtain and thereby defeats one of the major expected benefits. Since the subsoil is extremely low in its content of organic matter, apparently it would be unwise to apply only lime at that level.

Proper utilization of fertilizer is possibly the greatest problem confronting the farmer; however, it is not one that the farmer can be expected to solve. It is doubtful if more than fifty percent of the potential benefit from fertilizer is obtained under present tillage and placement methods and the ramifications peculiar to this problem are manifold.

Fertilizer placement tests with corn on badly depleted land indicate that deep placement gives much more satisfactory yields than shallow. Fertilizer placed at the ten inch level produced nearly twice as much corn as the same amount placed at the three inch level; yet deep placement is not the full answer because conditions in most soils to do naturally approach the ideal.

Most machines in use now, place fertilizer only about three inches below the surface and that depth is definitely too shallow for best results. The action in the soil is upward and fanwise from the placement band; and if the placement is too shallow, the action is expended near the surface where satisfactory moisture conditions are seldom found.

Shallow land preparation is conducive to excessive runoff of surface water and failure to store moisture is very poor husbandry. Yet the farmer is not to blame, because the design of the tillage implements now in use, is such that deeper plowing might well prove disastrous. If the land were plowed deep enough for much of the subsoil to be turned to the surface, the disturbance to the bacterial phenomena would result in poor crop yields.

Many crops do best when planted in furrows. If adequate drainage is not provided, seed planted at a low level are very apt to become waterlogged and rot during periods of heavy rainfall and low temperatures. Implements now in use do not provide for sub-surface drainage except as a separate and expensive operation.

In the not too distant future, the use of dry fertilizer materials will be as obsolete as the tillage methods now in vogue. Dry material is hard to control mechanically and its placement is hard to regulate. Its action in the soil is slow and uncertain, it is expensive to handle and, of necessity, its bulk is out of proportion to the amount of plant food available. Fertilizer applied in liquid or gas form below the soil surface and under such pressure as to effectively force it into the voids in the planting area, will do much toward assuring a higher return for the fertilizing dollar. With present tillage methods, however, liquid or gas fertilizer cannot be efficiently and effectively used.

The primary object of this invention is to overcome the aforementioned problems and difficulties in tilling, planting and cultivating soil, by providing a novel method of preparing the soil to a depth below the topsoil, for subsequent seeding, in which the subsoil is aerated and soil correctives and plant nutrients added thereto, (hereinafter referred to as deep tillage).

It is a still further object of this invention to provide a method of preparing the earth and planting seed therein, which will reduce soil erosion adjacent to the planted seeds and which will deepen the root zone for plant development.

It is a still further object of this invention to provide a novel method of preparing the soil in which the pH of the subsoil may be varied so as to enhance plant growth, in accordance with the type of crop to be planted.

It is a still further object of this invention to provide an improved planting method and implement therefor which plants seed below the normal ground level so that the normal distance between the seed and the underside of the implement towing vehicle is increased, thus permitting the use of a vehicle having relatively small ground clearance, such as a "jeep," to be used for subsequent cultivation operations.

It is a still further object of this invention to provide a novel method of preparing the soil which will more effectively utilize the nitrogen present in the soil, as well as a novel method of preparing the soil with a cover crop growing thereon, so as to more effectively utilize the nitrogen stored in the cover crop, thereby eliminating the necessity of applying excessively large amounts of fertilizer and plant nutrients prior to the subsequent planting of "cash" crops, as is now the case in present methods of soil preparation.

It is a still further object of this invention to provide a novel method of applying liquid or gas fertilizer in the earth substantially below the ground level thereof, as well as a method and mechanism which permits liquid fertilizer to be used in an efficeint manner, not possible with present methods and mechanisms.

These and other objects of this invention will become apparent from the following detailed description, taken in conjunction with the accompanying drawings in which:

Fig. 2 is a diagrammatical section of a portion of the soil after it has been partially prepared;

Fig. 3 is a view similar to Fig. 2, illustrating the soil after the seed has been planted therein by the implement;

Fig. 4 is a view similar to Fig. 3, which shows the development of the plant after the first cultivation, and indicates the amount and position of the soil which has been moved from the furrow;

Fig. 5 is a view similar to Fig. 4, after a second cultivation, and indicates the root development of the plant in relation to the subsoil and added topsoil; and Fig. 6 is a view similar to Fig. 5, after the third cultivation, showing the development of the root system in the soil.

Figure 1:
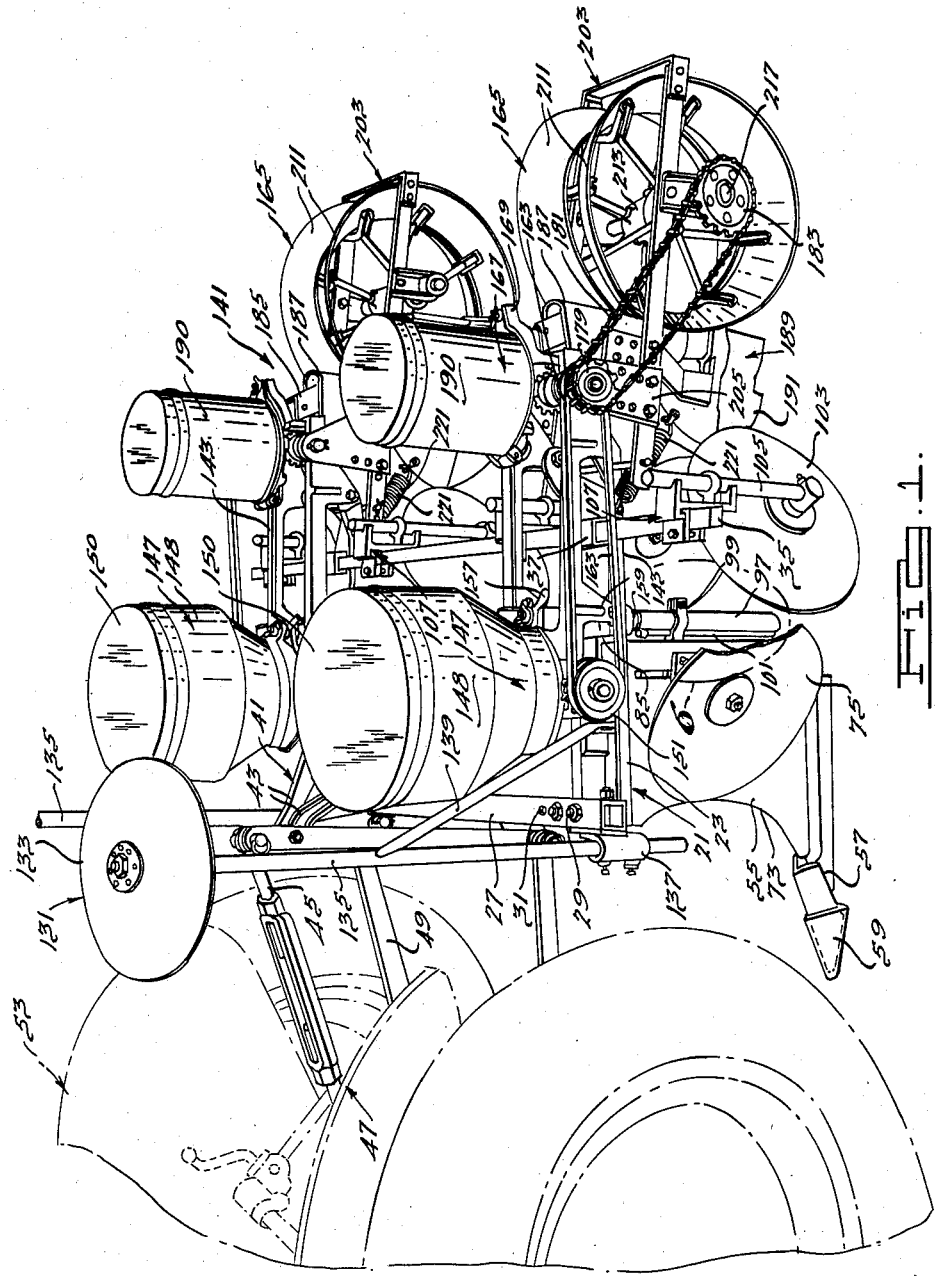
Fig. 1 is a side perspective view of the implement used to practice the method of this invention, connected to a towing vehicle.

The preferred implement by which the present method may be advantageously carried out is disclosed in Fig. 1 and is fully set forth as to structure and operation in my parent application which matured into the above referred to U. S. Patent No. 2,734,439. Therefore, further reference to the structural detail thereof is not believed to be required in the present application.

While the vertical position of the planting shoe and the ground-engaging wheels relative to the frame member 143 can be varied, there is, because of the rigid connection of the frame member 143 with the main assembly 21, a predetermined relationship between the plow shoe, the plow stock, fertilizing and cultivating disks, fertilizer tube, planting shoe and ground wheels, which will always insure that the soil is properly broken up below its ground level, that the fertilizer is deposited in exactly the right position and that the furrow is opened and partially closed in the right position with respect to the subsoil channel, and that the seed is planted in the proper position in the furrow list, while the furrow list is properly compacted with respect to the seed. The fact that the implement is arranged and assembled in the manner described, permits the tillage, fertilizing and planting operations to take place simultaneously and especially efficiently. It would not be possible to obtain the same results in as efficient or satisfactory manner if a plurality of separate implements were employed, such as planter or fertilizer mechanism whihc were separated from the tillage implement.

With regard to the implement of Fig. 1 there is provided an efficient and economical means of carrying out the deep tillage method, the subject matter of this invention, as well as the actual planting of the seed. As has been previously stated, deep tillage is a method of preparing earth for seeding, to a depth below the top soil, and this preparation constitutes a good deal more than merely cracking the earth or subsoil such as has been previously practiced when a farmer merely subsoiled his field. Subsoiling has in general been discouraged in recent times, because most soils, below the top level, are not conducive to plant growth, due to the presence of anaerobic bacteria and because of high concentrations of minerals which are conducive to low pH value in the subsoil. Plants generally will not grow in the subsoil because of low pH value and repulsive bacteria. The deep tillage method permits the utilization of the subsoil to more efficiently and economically produce better plants. With the deep tillage methods, and by the use of the aforementioned implement, it is even possible for a farmer to work a field without any prior preparation.

The implement is merely dropped down onto the ground and pulled by the towing vehicle. The plow point 59 moves through the subsoil at whatever depth the implement is adjusted for, for example from seven to fifteen inches below the ground level, so as to form the subterranean channel 91, in accordance with the shape of the plow point. The furrow forming disks 75 form the furrow 93 at the adjusted depth and width, and the plow stock connects the furrow with the channel through the vertical cut 95. The tube 97, in which the fertilizer hopper tube 159 is telescoped, and which has its lower end disposed adjacent to the channel 91, allows for aeration of the channel, that is the drawing into the subsoil of great quantities of air during the progress of the implement through the soil. The tube and fertilizer mechanism also allow for placement of specific elements, such as lime, magnesium, etc., that will act as conditioners for the soil. These factors will induce aerobic bacteria into the subsoil, which hastens oxidation in the lower areas. Furthermore, with an implement of this type the hydrogen ion concentration or pH of the soil may be brought to a value which is the best for the particular crop which is to be planted. Most plants prefer a soil which approximates a neutral point of pH 7, while it has been found by tests that at ten inches below the surface the pH may be down to 4 or 5. The pH value gets progressively smaller from the surface downward, but by following the deep tillage method it is possible to raise the pH value, through oxidation and the application of soil correctives, to whatever pH value is best for the crops.

The fertilizer applying mechanism also allows for the proper placement of fertilizers in the subsoil at a desired depth, and the depth of placement may be varied in accordance with the type of fertilizer used and the type of plant being grown, as previously described. Tests have shown that fertilizer placed in the subsoil produces much more corn than the same amount of fertilizer placed at or near the ground level of the soil. At the present time improper utilization of fertilizer is one of the greatest problems confronting the farmer. For example, nitrogen is the most volatile element of all the elements considered as plant nutrients. It is readily dissipated, both in ammonia form and in the nitrate form. Its passage through the soil is more readily upward toward the air than in other directions, away from the point of application. Therefore, a heavier blanket of soil over the point of application will help to absorb the escaping material and at least retard its escape over a much longer period. In normal tillage methods, no way has been devised whereby nitrogen bearing material can be placed to the most advantageous depth. With the deep tillage method, the placement of the material is approximately three to four times as deep as with normal tillage methods. Therefore, it can be readily appreciated that a much greater soil mass is available for blanketing the nitrogen bearing material and retarding its dissipation.

Nitrogen in the form of ammonia is highly volatile, but it is the most inexpensive form of nitrogen for use as a fertilizer. At temperatures of from 100° to 120° ammonia is dissipated in a very short time, and if it is placed near the surface of the ground, as in normal tillage methods, in the hot growing season, it is dissipated so rapidly that only a small benefit can be derived by the plants. However, if the ammonia liquid is placed at from ten to twelve inches below the surface, the soil mass at that point is relatively higher and dissipation is correspondingly many times slower. In fact, some benefit may be obtained as long as three years after the placement of the material at points deep in the soil. Thus the deep tillage method, and the implement of this invention, permit the placement of relatively inexpensive liquid or gas fertilizers, at depths substantially below the ground level, and when the furrow closing disks 103 move over the point of placement of the fertilizer, the fertilizer is properly covered to prevent its dissipation, while at the same time the surface soil tends to sift through the vertical cut into the subsoil channel and cracks and carry bacteria and other desirable oranisms into the subsoil, so as to help in the formation of new areas beneficial to crop production.

It will thus be appreciated that with the implement and method of this invention, the productive growing zone of the soil is greatly deepened by the placement of soil correctives and nutrients through the fertilizer mechanisms previously described.

After the furrow closing disks 103 have formed the cover 127, as shown in Fig. 3, or have completely closed the furrow, in accordance with the type of crop which is to be planted, the planting shoe 189 moves through the middle of the cover 127 and forms a seed trench 195 which, as illustrated in Fig. 3, is preferably midway between the sides of the cover. It should be noted that in crops such as corn the top of the cover will be below the normal ground level, so that the seed will be planted below the ground level and when the plant begins to grow it can be cultivated by implements which are towed by vehicles having relatively low ground clearance, for a greater length of time than if the seed were planted at or above the normal ground level. After the trench 195 has been formed by the planting shoe, the seed is dropped therein through the operation of the planting mechanism, which is driven either from the ground wheels 165 or the vehicle power take off. The seeds will be spaced in accordance with the setting of the planting mechanism. After the seed has been dropped into the trench 195, the ground engaging wheels 165 will move over the portion of the cover 127 adjacent to the seed. As has been previously pointed out, the inner edges of the ground wheel rims 211 are disposed on opposite sides of the seed so that the seed proper will not be packed into the ground. However, as the rims 211 are annularly disposed, they will compact the cover on each side of the seed so as to in effect form a trench between the opposite lateral edges of the cover and the side wall of the furrow 93. The list will be in effect crown-shaped, with the seed disposed at the uppermost point, and the seed will be covered by unpacked soil when the remainder of the list is compacted. Therefore, in the event of heavy rain or the like, the water will flow down into the trenches at each side of the list and will not wash out the seed. At the same time, due to the breaking up of the subsoil, the water can drain into the subsoil and any surplus water is carried away so as to prevent the seed and topsoil from becoming waterlogged. In addition, the trench and deep tillage will provide reservoirs to prevent excess runoff of the water from heavy rain and it will virtually eliminate the need for terraces on most soils. Still further, this deep tillage method provides, in addition to the adequate drainage for the seed bed, a moisture reservoir below the surface, far more extensive than that provided by any normal tillage implement, and this large reservoir provides more moisture over a much longer period than does the shallow blanket obtained by normal tillage methods. As the root zone of the plants is increased by the method and implement of this invention, the concentration of roots is allowed at a depth in the soil where the moisture content is most nearly constant, and since moisture is liquid for carrying the nutrients into the plant itself, this is important in gaining an increase in production.

It will thus be appreciated that with the implement of this invention a stubble field may be subsoiled, fertilized, listed, planted, and the soil firmed in such a way that rain will not sand the seed or furrow over and will not water-log the seed, all in one operation which is simple and inexpensive.

The deep tillage method furthermore permits the enhancement of the nitrogen content of the soil and prevents or reduces sheet erosion in other manners. For example, in certain parts of the country, winter cover crops are planted to enhance the nitrogen content of the soil and these plants are generally legume plants. One of the major problems in connection with cover crops has been the disposition of them before or at the time of planting of the subsequent "cash" crop. That is, it has been necessary to turn under winter cover crops and let the field lie from two to three weeks for decomposition to take place to the extent that it is safe to plant a subsequent crop. During the process of decomposition, nitrogen is drawn from the soil into the plant mass to hasten plant decomposition. During this period insects, especially cut worms and others of a kindred nature, hatch and become active in the warm plant mass. When the following "cash" crops are planted the worms are nearing their mature stage and do considerable damage to the young seedlings of the subsequent crop as they begin to appear above the ground. Also, with this method of disposing of cover crops, the plant roots on which the nitrogen nodules have formed, are exposed on the surface. This exposure of these organisms tends to hasten the dissipation of the nitrogen which has been stored through the growing season.

Furthermore, with normal tillage methods, three operations prior to the preparation for planting have been necessary. It has been necessary to first turn under the cover crop or ground cover, then smooth the soil and then, immediately prior to planting, provide a second light working of the topsoil. These operations are, of course, expensive, and in deep tillage these costs are eliminated, in that no prior preparation for planting is necessary. That is, the complete operation is effected at one time, as previously brought out.

In addition to the reduction in cost of preparation, the deep tillage method effects a saving in the nitrogen which the cover crop has stored in the soil, in that the roots, where the accumulation of nitrogen is heaviest, are left below the ground surface, except in the narrow line adjacent to and under the seed rows. The normal cover crop produces a considerable amount of nitrate nitrogen and thus can materially reduce the cost and the amount of nitrate nitrogen which must be applied by the farmer. If the storage nodules of the cover crop are exposed on the surface, as in normal tillage methods, a very large percentage of this nitrogen is dissipated through the denitrification process on the surface.

In deep tillage only an area covering about one-fourth of the soil surface is disturbed, and the cover crop roots and tops are pushed to the shoulders above the furrow before the denitrification is completed and the subsequent first cultivation of the planted crop has taken place, which will cause this matter to be pushed back to the edges of the water furrow and covered with soil, as will hereinafter appear. There is, therefore, only a small portion of the cover crop nitrogen lost with the deep tillage method, while almost half of the nitrogen is lost from the cover crop when normal methods are used. Furthermore, in the deep tillage method the seed is placed below the point of decomposition of the cover crop rather than above, and the heat that is generated during the decomposition of the cover crop passes off without damaging the seed. As has been previously pointed out, in the deep tillage method the plow moves through the cover crop and leaves it as it stands, so that it is not turned over, and in subsequent cultivations, using the deep tillage method, the overburden, or that portion of the cover crop on top of the ground, is cut and torn to pieces by the disks used for cultivation. This overburden is, therefore, worked in toward the seedling plants, to serve as a mulch and fertilizer, and in this way competition from the old crop is eliminated.

In certain areas green manure crops are planted in the fall and are normally turned under in the spring. These plants are non-leguminous and therefore fix no nitrogen in the soil, but take nitrogen from the soil in their process of decomposition after they are turned under. If the seed is planted too soon after the turning under of these crops, there is a very definite lack of nitrogen to stimulate the early growth of the newly planted crops and therefore large amounts of commercial fertilizer must be supplied. With the deep tillage method, as the crops are not turned under, very little decomposition of the green manure crop takes place and the nitrogen native to the soil is left in position to benefit the new seedlings, rather than drawn into the cover crop mass to aid in decomposition.

It will, therefore, be appreciated that the deep tillage method provides a new means of utilizing cover crops to obtain the maximum benefit therefrom and to reduce the amount of commercial fertilizer which must be employed. It will furthermore be appreciated that with the deep tillage method the previous steps of turning under the cover crop, smoothing and reworking the soil, etc., are eliminated, thereby reducing the cost of preparing the soil for planting.

One of the primary purposes of cultivation is, of course, to kill weeds, grass, or the like, which tend to interfere with the proper growth of the plant. By using the deep tillage method of soil preparation and planting, as previously described, and without prior preparation of the soil, weeds, grass, and the like are moved away from the plant, so as not to inhibit the growth thereof. That is, when the furrow is formed, the surface soil is moved to an outward position. As the surface soil usually has the heaviest infiltration of weeds and grass, the furrow list is made partially free of weeds because of the movement of the topsoil out of the furrow. In subsequent cultivating operations the trench between the cover and furrow acts as a receptacle for the soil that has been turned out. The cultivating disk gangs are preferably set so as to move the earth from the furrow shoulder into the furrow, as can be best seen in Fig. 4. The first cultivation of the plants should be at a time when the weeds first begin germination and the cultivation covers the weeds and smothers them out progressively, which will normally give the plants a thirty day start on the weeds. That is, the weeds are killed by cultivation and after the last cultivation of the plants, as will hereinafter appear, enough topsoil has been moved back into the furrow and killed enough of the weeds, so that the weeds will not interfere with the growth of the crops.

Cultivation furthermore aerates the soil and provides fairly loose friable soil with good capillary action, to aid in promoting root growth. Cultivation of this type is especially advantageous in exceptionally dense soils. Furthermore, as the root growth is substantially below the ground level, due to the placement of the seed and the preparation of the soil, there is no danger of cutting the roots of the plant during the cultivating operation. When the plant being grown is, for example, corn, a second cultivation should be made in a week or ten days after the first cultivation and this second cultivation moves the remainder of the soil from the furrow shoulder to a point adjacent to the plant so that the furrow is completely filled in, as can be seen in Fig. 5. Fig. 5 also illustrates the manner of the root growth of corn, with the deep tillage method. After the corn is about twenty inches tall, the third and last cultivation should be given and after the third cultivation the plant and soil will be disposed in substantially the manner illustrated in Fig. 6. The soil has been taken from each side of the furrow so that the top surface of the furrow is above the normal ground level after the third cultivation.

If additional fertilizer is to be used, it should at this time be applied, and as the roots have reached out from sixteen to twenty inches from the row, it is advisable to place the fertilizer at about this distance from the plants and from eight to ten inches below the surface. The additional application of fertilizer, either of the dry, liquid, or gas types, may be accomplished by using only the plow stock and fertilizer mechanisms on the implement, without the use of any of the furrow forming or closing disks. Thus, the fertilizer can be applied at a relatively deep depth, without materially disturbing the topsoil adjacent to the plants.

It will, of course, be appreciated that in addition to mechanical cultivation, control of weeds may be obtained by the use of chemical sprays, without departing from the scope of this invention. The implement of this invention is designed so that satisfactory soil air capacity is maintained, and the weeds properly killed, in a simple maner, and it will surrender no advantage to any other method being followed at the present time, although chemical weed control may be used in place of certain of the cultivating operations.

From the foregoing, it can be thus appreciated that the methods of this invention have a wide variety of uses in the preparation, planting, and cultivation of soil and plants, and it will be appreciated that this implement will work soil in a much more efficient and economical manner than has been possible in the past and will produce greater crop yields than has been possible heretofore, with a minimum of expense, cost and work.

The above being a complete description of an illustrative embodiment of the invention, what is claimed as new and desired to be secured by Letters Patent of the United States is:

1. The method of preparing soil for a subsequent planting operation including the steps of forming a channel of relatively loose soil a substantial distance below the ground level, of forming a ground furrow above the channel and a narrow, substantially vertical cut or section of loose soil between the channel and furrow, of aerating the soil in said channel and of depositing soil correctives in said channel so as to vary the pH of the soil substantially below the ground level.

2. The method of preparing soil for a subsequent planting operation including the steps of forming a channel of relatively loose soil a substantial distance below the ground level, of forming a ground furrow above the channel and a narrow, substantially vertical cut or section of loose soil between the channel and furrow, of aerating the soil in said channel and of depositing fertilizer in said channel so as to enhance the growing characteristics of the soil.

3. A method of preparing soil and planting seed therein, including the steps of forming a channel of relatively loose soil a substantial distance below the ground level, of forming a ground furrow above the channel and a narrow cut or section of loose soil between the channel and furrow, of depositing a soil nutrient in said channel, of at least partially filling said furrow so as to cover the soil nutrient and provide a furrow list, and of planting seed in the furrow list at a predetermined depth.

4. A method of preparing soil and planting seed therein, including the steps of forming a channel of relatively loose soil a substantial distance below the ground level, of forming a ground furrow above the channel and a narrow cut or section of loose soil between the channel and furrow, of depositing a soil nutrient in said channel, of at least partially filling said furrow so as to cover the soil nutrient and provide a furrow list, of planting seed in the furrow list at a predetermined depth and of compacting the furrow list on opposite sides of the seed.

5. A method of preparing soil and seeding a subsequent crop, in an area which has a cover crop growing thereon, including the steps of tilling the soil so as to form a subterranean channel of relatively loose soil, of forming a ground furrow above the channel and a narrow cut between the channel and furrow so that the cover crop growing in the soil will be left as it stood prior to the tilling operation except for the upturned cover crop adjacent the narrow area where the furrow is formed, of aerating the channel, of partially filling the furrow so as to form a furrow list, of planting seed in the furrow below the point of decomposition of the upturned cover crop so that the heat generated during the decomposition of the upturned crop passes off without damaging the seed, and of compacting the list adjacent the seed.

6. A method of preparing soil including steps of planting legume plants to enhance the nitrogen content of the soil and prevent or reduce sheet erosion, of, after the tops of the legume plant are above the soil, forming a subterranean channel of relatively loose material below the ground level, of forming a furrow above the channel and a vertical cut or section of loose soil between the furrow and channel so that the roots of the legume plant will not be upturned except in the narrow area of the furrow, of allowing the remainder of the legume plant to stand unimpeded so that the roots and the nitrogen storage nodules thereof are disposed below the ground level and so that the soil will act as a holding medium for the nitrogen, thereby eliminating surface decomposition and reducing nitrogen dissipation from the soil, of aerating the channel, and of depositing soil nutrients in the channel.

References Cited in the file of this patent

FOREIGN PATENTS

| | | |
|---|---|---|
| 253,643 | Germany | Nov. 14, 1912 |
| 804,498 | Germany | Apr. 23, 1951 |
| 838,663 | Germany | May 12, 1952 |